Patented Mar. 29, 1938

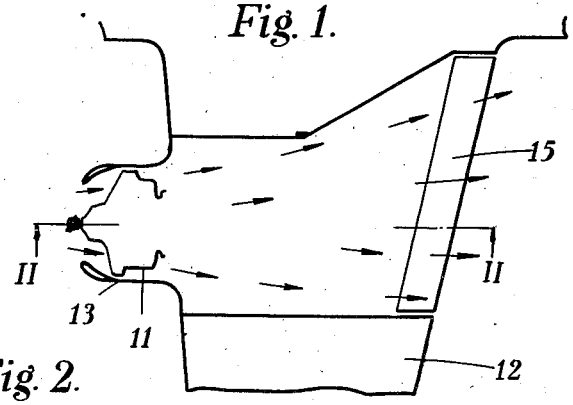
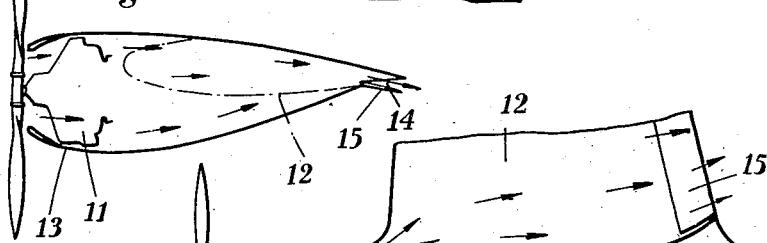
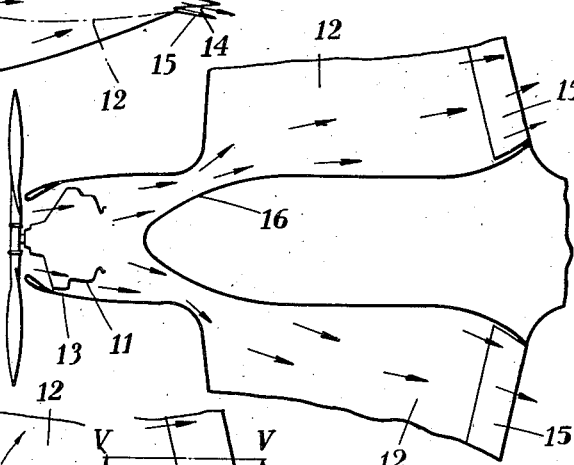
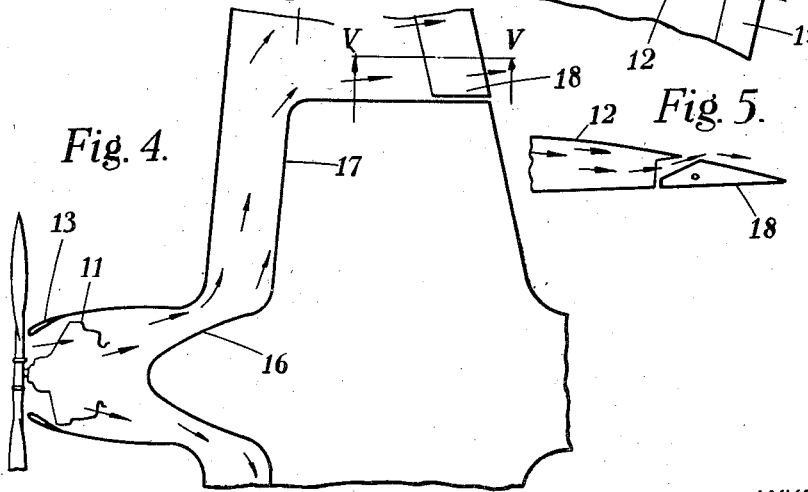
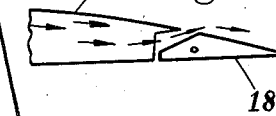

2,112,727

UNITED STATES PATENT OFFICE 2,112,727

COOLING OF AIRCRAFT ENGINES

John Lloyd, Coventry, England, assignor to Sir W. G. Armstrong Whitworth Aircraft Limited, Whitley, Coventry, England Application November 11, 1936, Serial No. 110,357 In Great Britain August 30, 1935

4 Claims. (Cl. 244—55)

This invention relates to the cooling of air-cooled aircraft engines, such as have their crankshafts arranged longitudinally of the aircraft, whether of the in-line, star, or other types.

The main object is to cool the engine adequately and at the same time to reduce drag.

According to one feature of the invention, the outlet end of the engine cowling is connected to transmit the cooling air into or through the interior of a wing of the aircraft which has at least one outlet, which may be controllable in size, in or near its trailing edge, or in its upper surface where the air pressure is relatively low.

When the engine is mounted in the nose of the fuselage and is enclosed in a cowling open at the front and back, the rear opening may be connected by a duct or ducts with the interior of a wing. This hollow part of the wing is open at its trailing edge, so that the cooling air issues there into the eddy which already exists behind the trailing edge.

A flap may be used at the outlet to control the air flow; and if arranged at the trailing edge of a wing, the flap may serve as an air brake or lifting flap.

The invention further involves, in the case of a cowled air-cooled engine mounted in the wing of an aircraft, forming the inlet orifice of the cowling as a horizontal slot.

In the accompanying drawings, which are diagrammatic:—

Figure 1 is a fragmentary sectional plan of an aeroplane having an air-cooled star-type engine mounted on a wing and arranged according to the invention, Figure 2 being a cross-section taken on the line II—II of Figure 1;

Figure 3 is a fragmentary sectional plan of an aeroplane having an air-cooled star-type engine mounted in the nose of the aeroplane body and arranged according to the invention;

Figure 6:
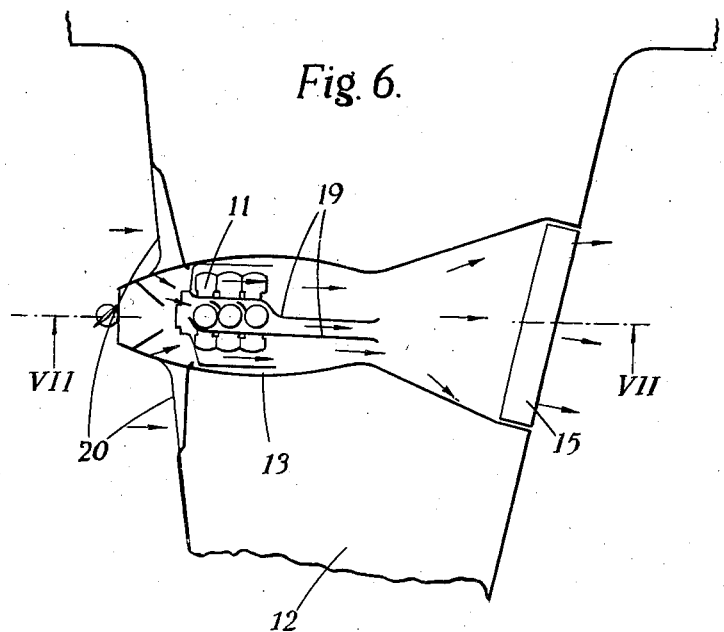
Figure 7:
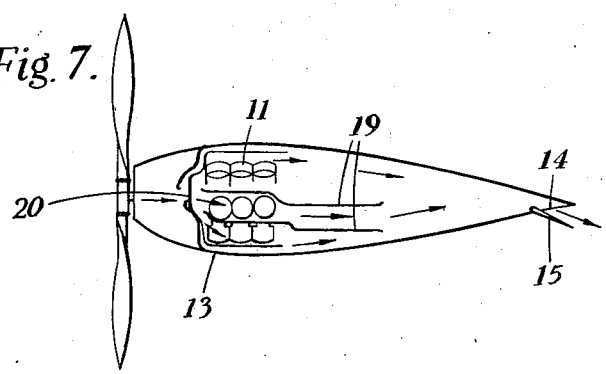
Figure 8:
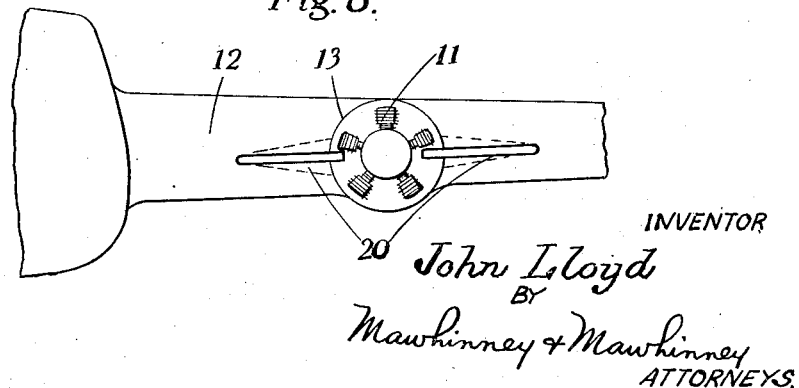

Figure 4 is a fragmentary sectional plan of an alternative method, according to the invention, of arranging an air-cooled star-type engine in the nose of an aeroplane body, Figure 5 being a detail sectional view taken on the line V—V of Figure 4; and Figure 6 is a fragmentary sectional plan of an aeroplane having an in-line, star, air-cooled engine mounted on a wing and arranged according to the invention, Figure 7 being a cross-section taken on the line VII—VII of Figure 6 and Figure 8 being a front view thereof.

Like numerals indicate similar parts throughout the drawings as far as possible.

In the construction of Figures 1 and 2, the engine 11 is mounted on the wing 12—the chain line in Figure 2 represents what the section of the wing would be at the line II—II of Figure 1 if the wing were continuous there. The engine is surrounded by an annular cowling 13 which is faired into the wing, the cowling directly communicating at its rear end with the interior of the wing so that all the air entering the cowling and flowing past the engine is directed into the interior of the wing. An outlet opening 14 is provided in the trailing edge of the wing and this is shown in the drawings as being controlled by a pivoted flap 15 movement of which varies the outlet opening and thus the amount of cooling air flowing past the engine. The flap in question may be used as an air-brake if desired.

In the arrangement of Figure 3, the rear end of the cowling is directly connected to the leading edges of the wings on opposite sides of the body, and a bulkhead 16 is provided in the latter to cause the cooling air to travel into the interior of the wings, whence it can be evacuated through controllable slots as described in connection with Figures 1 and 2.

In the modification shown by Figures 4 and 5, the bulkhead 16 is extended laterally into the wings, as indicated at 17, to cause the air to travel outwardly along the wings to a greater extent than in the modification of Figure 3, and in the construction of Figure 4 the air is released through the openings between the trailing edge of the wings and the ailerons 18.

In the construction of Figures 6 to 8 the engine is a fifteen-cylinder one of star form, but with the cylinders arranged in five lines each of three cylinders. Internal baffles 19, 19 are disposed between each adjacent pair of lines. In this construction, moreover, the inlet orifice 20 to the cowling 13 is in the form of a horizontal oval opening or other slot.

Thus the disturbance of the air round the usual cooling air outlet, which is just behind the engine cowling, is avoided and the total drag of the aircraft is thereby reduced.

What I claim as my invention and desire to secure by Letters Patent of the United States is:—

1. In an aircraft structure, a hollow supporting wing, a cowling having its front end open and its rear portion communicating with the interior space of the hollow wing, an air-cooled engine housed entirely within said cowling and having space between the engine and the cowling for the circulation of air received through the front open end of the cowling and having a propeller forwardly of the open end of the cowling, said air passing backwardly through the cowling and into the hollow wing, said wing having at its rearmost trailing edge and in the lower part of said edge an opening for the escape of the cooling air into the eddy existing behind the trailing edge, and a combined valve means and aileron for opening and closing said opening and for varying the port area of the opening, said valve means opening outwardly and downwardly to serve as an air brake and lifting flap, said opening being above said valve means whereby the exhaust cooling air is brought out along the space above the upper face of the combined air brake and lifting flap.

2. In an aircraft construction, a hollow wing, a cowling having its rear end portion communicating with the interior space of the hollow wing and having an open end, an air-cooled engine mounted entirely in said cowling with space about the engine within the cowling for the passage of currents of air having a propeller forwardly of the open end of the cowling, a bulkhead having a rounded nose mounted in said wing with the rounded nose projecting partially into the rear end portion of said cowling and spaced from the side walls of the cowling and the wing to permit of the passage of air currents and to divert such air currents to opposite side portions of the hollow wing, said hollow wing having openings at its trailing edge at opposite sides of said bulkhead, said openings being in the lower wall of the trailing edge of the wing, and combined flap valves and ailerons pivotally mounted in said wing for opening and closing said openings and for varying the port area of said openings to control the volume of cooling air passing through said cowling and wing, said flap valves opening downwardly to serve as air brakes or lifting flaps, said openings being disposed immediately above said flap valves, said flap valves being pivoted at the lower portions of said openings whereby the exhaust cooling air is brought out along the space above the upper faces of the combined air brakes or lifting flaps.

3. In an aircraft construction, a hollow wing, a cowling having its rear portion connecting with said wing and interiorly communicating with the interior space of the wing, said cowling having a front open end, an air-cooled engine mounted entirely in said cowling at the forward portion thereof with space around the engine within the cowling for the passage of currents of cooling air and having a propeller forwardly of the open end of the cowling, a bulkhead having a rounded nose in said hollow wing and projecting partially into the rear portion of the interior space of the cowling for diverting the air currents from the cowling in the opposite side portions of the wing, said bulkhead having lateral extensions lying within the opposite side portions of the wing and spaced from the front wall of the wing, said hollow wing having openings at the lower side of its rear trailing edge for the escape of the cooling air into the eddy which already exists at the trailing edge of the wing, and combined flap valves and ailerons pivoted at their forward end portions in said openings for opening and closing said openings and varying the port area thereof, said flap valves movable downwardly to open said openings and at the same time serve as air brakes or lifting flaps, said openings being above the flap valves, said flap valves being pivoted at the lower edges of said openings whereby the exhaust cooling air is brought out along the space above the upper faces of the flap valves inducing considerable atmospheric rarity and eddying above and behind the flap valves.

4. In an aircraft construction, a hollow wing, a cowling having a front open end with its rear portion opening into said hollow wing, an air cooled engine mounted entirely in said cowling, said engine composed of rows of cylinders spaced apart radially, baffle plates interposed between and extending rearwardly of said rows of cylinders and partitioning off the space between the cylinders into separate chambers through which the cooling air may pass, said wing having an opening at its trailing edge, and a combined valve means and aileron for opening and closing said opening and for varying the port area thereof, said hollow wing having at substantially the center of its leading edge a long narrow inlet opening for air, said wing also having a closed wall directly back of said long narrow inlet opening, said wing also having a port therein at the inner ends of said long narrow inlet opening, said port placing said long narrow inlet opening in communication with the interior hollow space of the wing forwardly of said engine and said baffle plates, said wall and port inducing the air to flow laterally into the wing.

JOHN LLOYD.